United States Patent
Juliato et al.

(10) Patent No.: US 11,463,262 B2
(45) Date of Patent: Oct. 4, 2022

(54) VOLTAGE ENCODED MAC AND BUS SCRAMBLING

(71) Applicant: Intel Corporation, Santa Clara, CA (US)

(72) Inventors: Marcio Juliato, Portland, OR (US); Shabbir Ahmed, Beaverton, OR (US); Christopher Gutierrez, Hillsboro, OR (US); Xiruo Liu, Portland, OR (US); Manoj Sastry, Portland, OR (US); Liuyang Yang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 363 days.

(21) Appl. No.: 16/720,956

(22) Filed: Dec. 19, 2019

(65) Prior Publication Data

US 2020/0127848 A1 Apr. 23, 2020

(51) Int. Cl.
*H04L 9/32* (2006.01)
*H04L 12/40* (2006.01)

(52) U.S. Cl.
CPC ............ *H04L 9/3242* (2013.01); *H04L 12/40* (2013.01); *H04L 2012/40215* (2013.01); *H04L 2012/40273* (2013.01)

(58) Field of Classification Search
CPC .................. H04L 9/3242; H04L 12/40; H04L 2012/40215; H04L 2012/4073
USPC ........................................................ 713/168
See application file for complete search history.

(56) References Cited

U.S. PATENT DOCUMENTS

| | | | |
|---|---|---|---|
| 2015/0288583 A1* | 10/2015 | Le | H04L 49/1515 370/252 |
| 2018/0262527 A1* | 9/2018 | Jain | H04L 9/0838 |
| 2018/0268174 A1* | 9/2018 | Bathurst | H04W 4/48 |
| 2018/0295112 A1* | 10/2018 | Coppola | H04L 9/14 |
| 2019/0334720 A1* | 10/2019 | Zeh | H04W 12/02 |
| 2020/0374151 A1* | 11/2020 | Meier | H04L 1/0045 |
| 2021/0306177 A1* | 9/2021 | Fredriksson | H04L 12/40104 |

* cited by examiner

*Primary Examiner* — Dereena T Cattungal
(74) *Attorney, Agent, or Firm* — KDB Firm PLLC

(57) ABSTRACT

Various embodiments are generally directed to providing authentication and confidentiality mechanisms for message communication over an in-vehicle network. For example, authentication data associated with a communicating node may be transmitted over the network by encoding different predefined voltage levels on top of the message bits of the message being communicated. Different voltage levels may represent different encodings, such as a bit-pair or any bit combination of the authentication data. In a further example, messaging confidentiality between at least two communicating nodes may be achieved by pseudo-randomly flipping, or scrambling, the dominant and recessive voltages of the entire message frame at the analog level based on a pseudo-random control bit sequence.

25 Claims, 13 Drawing Sheets

100

*200*

220

| Calibration | MAC | EDAC |
|---|---|---|
| Beginning of the frame | Message Payload | Remainder of the frame |

VOLTAGE ENCODED MAC AND BUS SCRAMBLING

TECHNICAL FIELD

Embodiments described herein generally relate to providing authentication and confidentiality mechanisms for an in-vehicle communications network.

BACKGROUND

A vehicle bus may be a specialized internal communications network that interconnects various components (e.g., electronic control unit) inside a vehicle (e.g., automobile, bus, train, industrial vehicle, agricultural vehicle, ship, aircraft, spacecraft). Networking protocols may be used to facilitate information communication between the vehicular components. For example, a Controller Area Network (CAN bus) may be a message-based protocol and used to allow microcontrollers, devices, and their respective applications to communicate with each other. However, the increasingly high number of electronic components in vehicles and the implementation of different types of vehicular communication exposes the vehicles to various types of Controller Area Network attacks, such as sniffing, denial of service, spoofing, snooping, or the like.

BRIEF DESCRIPTION OF THE DRAWINGS

FIG. 2C illustrates an example message frame.

DETAILED DESCRIPTION

Figure 1:
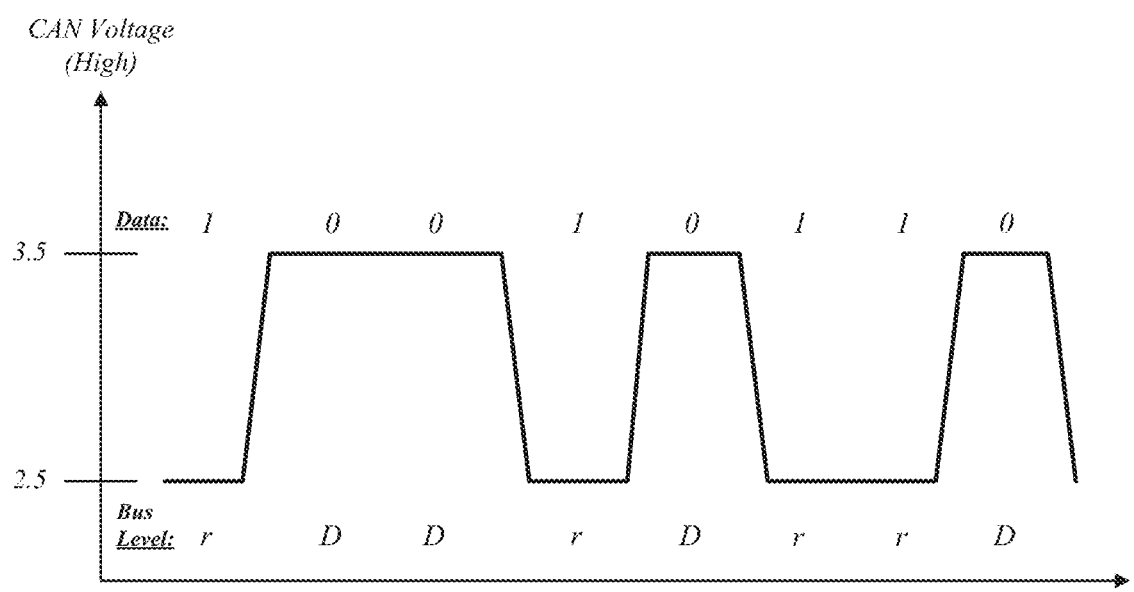
FIG. 1 illustrates an example data transmission over an in-vehicle network.

Various embodiments are generally directed to providing authentication and confidentiality mechanisms for message communication over an in-vehicle network (e.g., CAN bus). In embodiments, an authentication data, such as an authentication tag, message authentication code (MAC), etc., associated with a communicating component may be transmitted over the in-vehicle network by encoding a predefined voltage level on top of one or more message bits of a message being transmitted. For example, different voltage levels may represent different encodings, such as a bit-pair or any bit combination of the authentication data. In further embodiments, messaging confidentiality between at least two communicating components within the in-vehicle network may be achieved by pseudo-randomly flipping the dominant and recessive voltages of an entire message frame at the analog level based on a pseudo-random control bit sequence. Thus, the receiving component may be able to decode the scrambled message correctly while an adversary would only be able to see a pseudo-random stream of bits on the CAN bus and would not be able to decode the information.

In currently existing solutions, the transmission of authentication data or any other type of information that can properly authenticate the messaging parties is infeasible due to limited bandwidth, latency constraints, key management requirements imposed on the CAN bus. Since authentication-related information require more bits to be transmitted with or along side a message, more than one CAN bus system would have to be installed in the vehicle to accommodate the near-simultaneous transmission of the additional bits, which is impractical and costly. Moreover, in currently existing solutions, messaging confidentiality in in-vehicle networks does not exist, which allows any adversary to snoop, reverse engineer, and acquire proprietary information (e.g., automotive Data Base Container, DBC, file) transferred via the CAN bus.

The embodiments and examples described herein are advantageous and overcome the above problems and shortcomings of existing solutions. For example, as described above, a sending component may encode—at the physical level—different predefined voltage level on top of one or more message bits of a message that is being sent to one or more receiving components over the CAN bus. The predefined voltage levels encoded on the message bits may be different and may represent different bit combinations of the authentication data associated with the sending component, such as message authentication code (MAC). In at least that regard, the effective channel bandwidth can be increased and authentication data (e.g., in the form of a MAC) can be layered or "piggy-backed" onto message data, which can be decoded by the one or more receiving components to authenticate the sending component. Moreover, messages communicated among in-vehicle components may be scrambled by flipping the dominant and recessive voltages of the message at the analog level based on a pseudo-random control bit sequence and accurately unscrambled at the receiving component(s) while resolving arbitration in real-time or near real-time. Thus, confidentiality for the entire message frame is achieved.

FIG. 1 illustrates an example data transmission 100 over an in-vehicle network (e.g., CAN bus) according to one or more embodiments of the disclosure. It may be understood that a CAN bus may use at least two dedicated wires for communication: CAN high and CAN low. In examples, when data bits are being transmitted on the CAN high line, it can be set at a nominal recessive voltage (e.g., 2.5 volts) and a nominal dominant voltage (e.g., 3.5 volts) up to a maximum tolerance threshold voltage (e.g., 4.5 volts). In further examples, when data bits are being transmitted on the CAN low line, it can be set at a nominal recessive voltage (e.g., 2.5 volts) and a nominal dominant voltage (e.g., 1.5 volts) and can drop to a maximum tolerance threshold voltage (e.g., 0.5 volts). It may be understood that the tolerance voltage limits may be predefined and adhere to the CAN bus standards.

As shown, data 100 may be transmitted on the CAN high line, where 3.5 volts represents the CAN high dominant level and 2.5 volts represents the CAN high recessive level. In the example data transmission 100, at least data bits "10010110" may be transmitted over the CAN bus. The data bits may be included or be part of the data payload portion of a CAN message frame. As further shown, the bus levels corresponding to 10010110 may be recessive ("r"), dominant ("D"), dominant, recessive, dominant, recessive, recessive, and dominant. The illustrated data transmission 100 and the illustrated data bits have been highly simplified for ease of explanation and it may be understood that more complicated types of data transmission (e.g., in the quantity of data bits and complexity) may be possible.

Figure 2A:
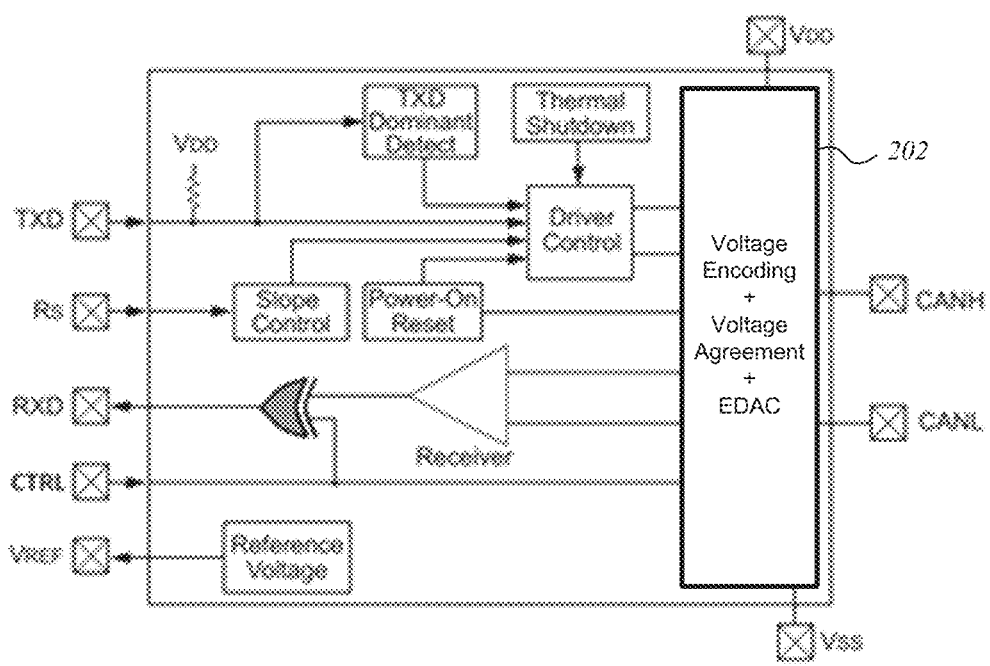
FIG. 2A illustrates an example transceiver with voltage encoding circuitry.

FIG. 2A illustrates an example transceiver 200 according to one or more embodiments of the disclosure. As shown, the transceiver 200 may include numerous components, such as a driver control, a receiver, detection and shutdown circuitries, and the like that may be known in the art. Moreover, as shown, the transceiver 200 may include circuitry 202 for at least performing voltage encoding of authentication data onto one or more portions of a transmitted message, performing voltage agreement (e.g., agreed voltage levels related to the encoding) between the transceiver 200 and a receiving transceiver, and performing error detection and correction (EDAC), the features and functionalities for which will be further described below. It may be understood that the transceiver 200 (or any other transceiver similar thereto) may be coupled to or arranged in a vehicular component such that the vehicular component can communicate with one or more other vehicular components that also include respective transceivers. Moreover, it may be understood that transceiver 200 and the configuration of the components therein are illustrated as examples only and not limited thereto, and as such, numerous other types of configurations and transceivers may be contemplated.

Figure 2B:
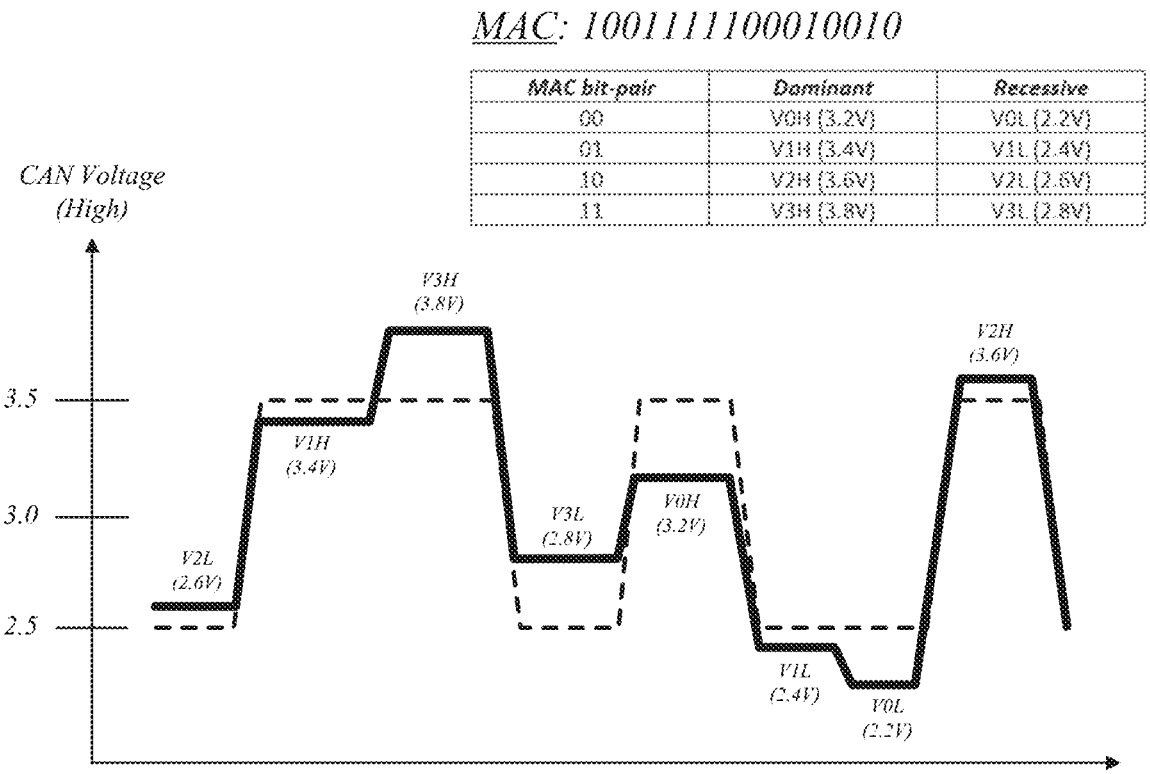
FIG. 2B illustrates an example voltage-encoded data transmission.

FIG. 2B illustrates an example voltage-encoded data transmission 220 according to one or more embodiments of the disclosure. For instance, a vehicular component (which may otherwise be referred to as a sending node) may encode an authentication data onto one or more portions of a message (e.g., message payload) being transmitted over a CAN bus based on an encoding scheme. For ease of ease of explanation, the message bits 10010110 shown in FIG. 1 will be used to describe the features associated with the voltage-encoded data transmission 220 of FIG. 2.

In examples, the authentication data may be in the form of a MAC (e.g., "1001111100010010") corresponding to the sending node, as shown. In the encoding scheme, "n" voltage levels for CAN high or CAN low (or both) may be encoded on top of each message bit of the message frame, and thus, making it possible to carry log 2(n) bits of the MAC per bit of the message. If, for instance, four different voltage levels can be encoded for each message bit, where n=4, then two bits of the MAC may be carried on each bit of the message. With a four-level encoding scheme, a 128-bit MAC, for instance, can be encoded onto a 64-bit message payload.

One or more encoding schemes may be shared, known, or agreed upon among the communicating parties. As indicated by the chart illustrated in FIG. 2, an example encoding scheme may assign a specific voltage level to a MAC bit-pair for both the dominant and recessive bus levels. For example, for MAC bit-pair "00," baseline voltages V0H and V0L may be assigned for the dominant and recessive levels, respectively, where V0H may be set at 3.2 volts and V0L may be set at 2.2 volts. In another example, for MAC bit-pair "01," first step voltages V1H and V1L may be assigned for the dominant and recessive levels, respectively, where V1H may be set at 3.4 volts and V1L may be set at 2.4 volts. In a further example, for MAC bit-pair "10," second step voltages V2H and V2L may be assigned for the dominant and recessive levels, respectively, where V2H may be set at 3.6 volts and V2L may be set at 2.6 volts. In yet another example, for MAC bit-pair "11," third step voltages V3H and V3L may be assigned for the dominant and recessive levels, respectively, where V3H may be set at 3.8 volts and V3L may be set at 2.8 volts. While FIG. 2B illustrates an example of "hard-coding" the different voltage levels onto the message bits to encode the MAC based on a fixed, predefined, or agreed-upon encoding scheme, it may be understood that dynamic, on-the-fly voltage agreement information may be encoded onto the initial message bits of a message frame, which can be used by the receiving node to decode the MAC and other related information in a highly dynamic manner. In at least that regard, dynamic encoding-decoding sessions can be performed.

Though not shown, it may be understood that, in other examples, the voltage levels corresponding to the four different bit-pairs of the MAC on both the dominant and recessive levels may be based on predefined voltage increments (e.g., 0.2 V) relative to the "normal" dominant and recessive voltage levels on the CAN high line, e.g., 3.5 volts and 2.5 volts. Thus, for example, V0H may be set at 3.7 volts (+0.2 V relative to the 3.5 V), V1H may be set at 3.9 volts, V2H may be set at 4.1 volts, and V3H may be set at 4.3 volts, as long as the maximum tolerances are not violated.

Other ways to encode the MAC bit-pairs onto the message bits may be also possible. In one example, voltage increments used for encoding the MAC on the CAN high line can be different from the voltage increments used on the CAN low line. The CAN high and low lines can be decoupled and have different increments. For instance, the CAN high line may have VHmax and VHmin values, and similarly, the CAN low line may have VLmax and VLmin values. The number of voltage levels for the CAN high line may be represented by $n_H$ and the CAN low line may be represented by $n_L$. Thus, the increment ($i_H$) for the CAN high line may be $i_H=(VHmax-VHmin)/n_H$. Moreover, the increment ($i_L$) for the CAN low line may be $i_L=(VLmax-Vlmin)/n_L$. In another example, the number of possible levels of the CAN high and low lines are not required to be identical. For instance, the CAN high line may have more voltage levels than the CAN low line and vice versa. In yet another example, the voltage increments are not required to be indexed in any gradient or crescent order according to the MAC bits or bit pairs. It may be understood that the voltage increments can be gradient, crescent, decrescent, random, or follow any other sequencing schemes, and thus, no specific order or assignment of the voltage increments is required or foreseen. Furthermore, as described above, the voltage levels may be agreed upon by the communicating nodes beforehand and may be used for a predefined set of frames, but in other examples, the voltage levels may be dynamically agreed upon on-the-fly and used for individual frames.

Based on the encoding scheme defined in the table shown in FIG. 2, each of the eight MAC bit-pairs (10, 01, 11, 11, 00, 01, 00, and 10) of the MAC 1001111100010010 is encoded onto each of the eight message bits 10010110 illustrated in FIG. 1. Advantageously, this effectively increases the bandwidth of the communication channel between the communicating nodes on the CAN bus without physically requiring the installation of more CAN lines or CAN-based hardware in the vehicle.

As shown, the first MAC bit-pair 10 can be encoded onto the first message bit by adjusting, changing, tuning, signaling, or setting the originally-set recessive 2.5-volt level to the second step V2L voltage level of 2.6 in accordance with the encoding scheme. Similarly, the second MAC bit-pair 01 can be encoded onto the second message bit by adjusting the originally-set dominant 3.5-volt level to the first step V1H voltage level of 3.4 according to the encoding scheme.

Moreover, the third MAC bit-pair 11 can be encoded onto the third message bit by adjusting the dominant 3.5-volt level to the third step V3H voltage level of 3.8, and so on until all of the bit-pairs of the MAC have been encoded, as illustrated in FIG. 2. For comparison, the data transmission 100 of FIG. 1 is shown in dashed-line and superimposed on the voltage-encoded data transmission 200.

According to embodiments, a receiving node may consume the voltage-encoded message frame and read the voltage levels associated with each CAN bit. The receiving node may decode the MAC based on the encoding scheme specified in the above-described chart. Thus, the receiving node may determine that the received MAC is 10 01 11 11 00 01 00 10.

It may be understood that the chart or the encoding scheme therein can be public and not required to be secret so that any other component can decode information based on the same encoding scheme. The key, however, used to generate the MAC may be required to be private among the communicating nodes. For example, the receiving node may receive the voltage-encoded message frame, decode it to derive the MAC, compute its own MAC using the private key, and determine whether the computed MAC matches the decoded MAC received in the message. Alternatively, in some examples, the encoding scheme can be private to just the communicating nodes.

Moreover, it may be understood that the CAN low line may be used to transmit voltage-encoded data over the CAN bus similar to the approach described above with respect to the CAN high line. The CAN low line can move in the opposite voltage-level direction, and thus, offers distinct amplitudes for encoding combinations.

In further examples, in addition to the MAC bits, other types of bits may be voltage-encoded onto various portions of the message frame. FIG. 2C illustrates an example message frame 240 according to one or more embodiments of the disclosure. The message frame 240 may be a CAN frame. As shown, calibration bits for calibrating communication between the sending and receiving nodes may be voltage-encoded at the beginning of the message frame. Other types of bits may also be encoded at the beginning of the message frame, such as dynamic voltage agreement information, as described above. Moreover, the authentication data (e.g., MAC) may be voltage-encoded onto portions of the message payload of the frame. It may be understood that the MAC does not have to be encoded onto all of the message bits. For instance, the more MAC bits that can be encoded onto a single message bit, less message bits will be needed to encode the entire MAC. In other instances, error detection and correction (EDAC) bits for reliable delivery of the message payload over the communication channel may also be voltage-encoded onto the remainder portions of the message frame (e.g., other than the beginning and payload portions of the message frame). In yet further instances, the calibration or EDAC bits may be voltage-encoded onto the payload bits in addition to the MAC bits if the voltage-encoding scheme implements a sufficient number of possible voltage levels. EDAC bits will serve to detect and correct errors on the other bits encoded over the data frame signal (e.g. correct MAC bits). As described above, the voltage encoding and voltage level agreement functionalities and EDAC procedure may be executed, run, or supported by, for example, circuitry 202 of FIG. 2A.

Figure 3A:
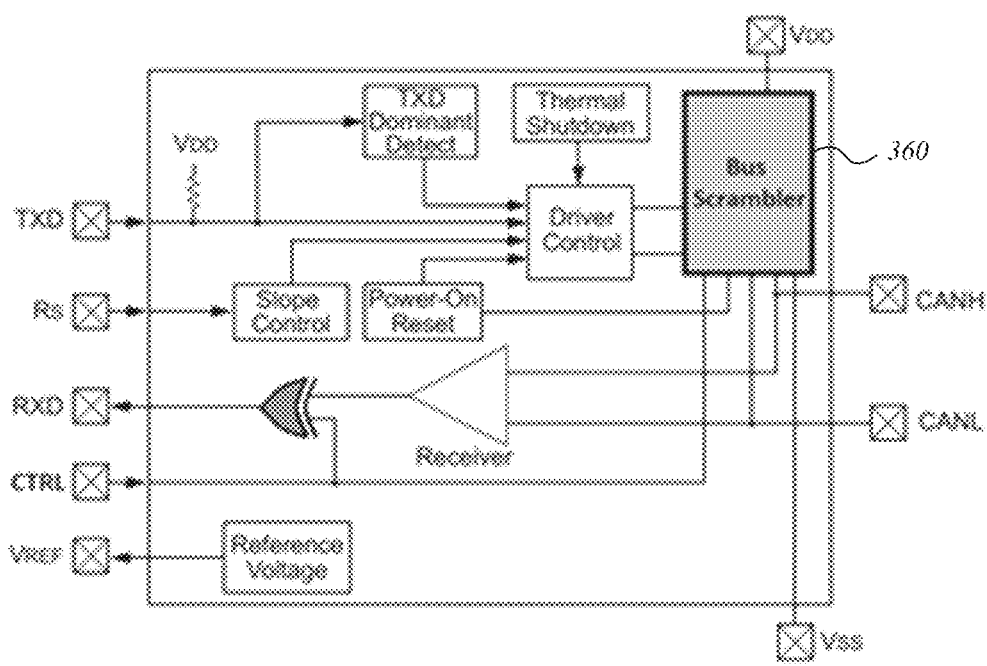
FIG. 3A illustrates an example transceiver with bus scrambling circuitry.
Figure 3B:
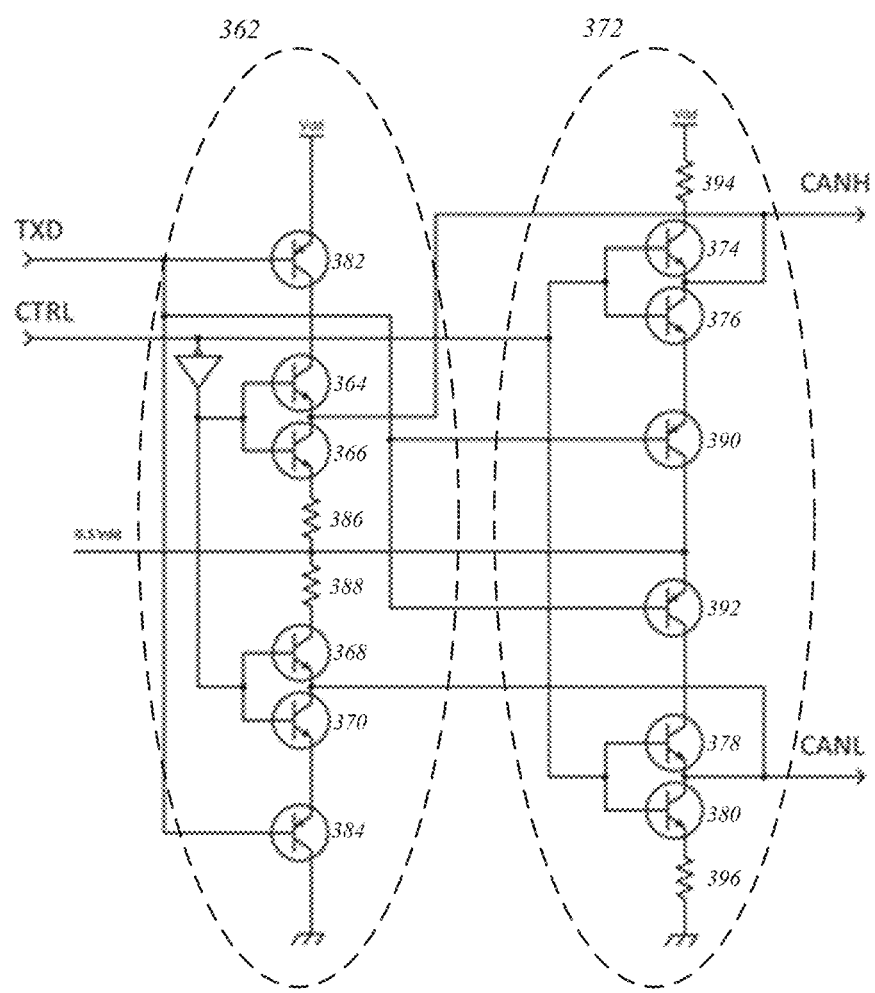
FIG. 3B illustrates an example bus scrambling circuitry.

FIG. 3A illustrates an example transceiver 300 and FIG. 3B illustrates an example bus scrambling circuitry 360 (which is referred to as a "bus scrambler" in FIG. 3A) configured in the transceiver 300 according to one or more embodiments of the disclosure. As shown, the transceiver 300 may be configured similar to transceiver 200 and the components therein may also be similar. In some examples, circuitry 202 of transceiver 200 and the scrambling circuitry 360 of transceiver 300 may be implemented in the same transceiver. As described above, bus scrambling may be a confidentiality-based mechanism that provides full encryption of an entire CAN message frame by pseudo-randomly flipping the dominant and recessive levels (e.g., flipping the recessive with the dominant level, flipping the dominant with the recessive level) of the CAN high and CAN low lines while resolving bus arbitration in real-time or near real-time.

In examples, the transceiver 300 may be configured to invert the CAN bus levels, e.g., "CANH" and "CANL," as shown in FIG. 3A, according to a control signal or control bits, "CTRL," coupled or input to the bus scrambler 360. The control signal or control bits may be generated or produced by a pseudo-random number generator (PRNG). It may be understood that the PRNG may require a seed to be distributed across the communicating nodes, and further, resynchronization mechanisms may be required to keep the modules in-phase with the current pseudo-random bit.

In one embodiment, the transceiver 300 may receive a control bit (e.g., a pseudo-random bit) and, depending on the value of the bit (e.g., zero, one), the transceiver 300 may invert the CAN bus levels accordingly. As will be further described below, when the control bit (e.g., CTRL bit) is zero, the transceiver 300 may operate normally and not invert the CAN bus lines. For instance, a logical data bit "0" may cause CAN high to be 3.5 volts and CAN low to be 1.5 volts, whereas a logical bit "1" would bring both the CAN high and low to approximately 2.5 volts, according to standard operating procedures. However, when the control bit is one, the transceiver 300 the bus scrambler 360 of the transceiver 300 may invert the CAN bus levels. Thus, for example, for the logical data bit 0, both the CAN high and low may be set to approximately 2.5 volts, whereas the logical data bit 1 may cause CAN high to be 3.5 volts and CAN low to be 1.5 volts.

FIG. 3B illustrates the various circuit components and configurations of the components in the bus scrambling circuitry 360 (e.g., the bus scrambler 360 in transceiver 300) according to embodiments. It may be understood that the configuration and placement of the illustrated circuit components in FIG. 3B have been simplified for purposes of explanation and not limited thereto, and thus, the scrambling circuitry 360 may include additional components and additional configurations not shown.

As shown, a left vertical portion 362 of the circuit 360 is responsible for generating the appropriate bus levels when the received CTRL bit is zero. For instance, when the CTRL is zero, transistors 364, 366, 368, and 370 will turn on, and consequently, connect the output signals of the CANH and CANL to the left vertical portion 362 of the circuit 360. At a right vertical portion 372 of the circuit, transistors 374, 376, 378, and 380 may all be turned off when transistors 364, 366, 368, and 370 are turned on, thereby disconnecting the right vertical portion 372 of the circuit 360 from CANH and CANL.

In examples, when the transmit-data ("TXD") line is zero, transistor 382 will turn on and, thus, pull the CANH to a high level. For instance, the actual CANH voltage may be the "Vdd" voltage minus the voltage drop of transistors 382 and 364. Similarly, transistor 384 will also turn on, leading CANL to a low level, the voltage will correspond to the voltage drop on transistors 384 and 370. This may be understood to be the dominant configuration. When the TxD line is one, transistors 382 and 384 will turn off, and resistors 386 and 388 may pull down both the CANH and CANL to a voltage close to 0.5 Vdd. This may be understood to be the recessive configuration, since resistors 386 and 388 only pulls CANH to 0.5 Vdd but will not maintain that level if there is any other entity on the bus driving CANH to a high level.

In further examples, when the CTRL is one, the right vertical portion 372 of the circuit 360 may activate and transistors 374, 376, 378, and 380 may be turned on. At the same time, the left vertical portion 362 will be disconnected and transistors 364, 366, 368, and 370 may be turned off. In this configuration, when TXD is zero, transistors 390 and 392 will turn on and, thus, bring both CANH and CANL to a middle voltage level, which may be approximately 0.5 Vdd. This now may be understood to be the dominant level event though it is approximately 2.5 volts. And when TXD is one, both transistors 390 and 392 will turn off and, consequently, CANH will be pulled up to a high level via resistor 394 and CANL will be pulled down to a low level via resistor 396.

Figure 4:
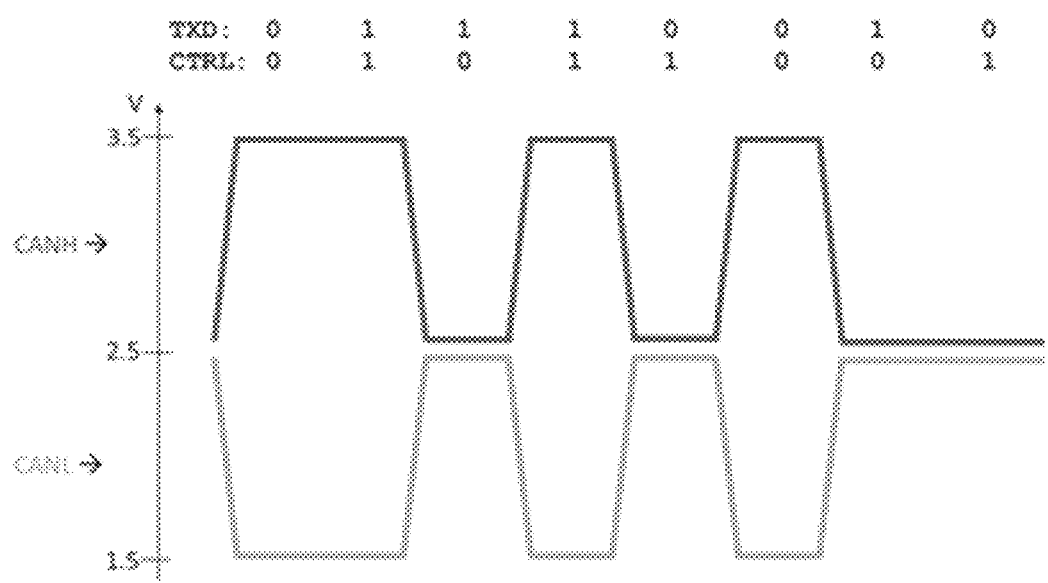
FIG. 4 illustrates an example of bus scrambling with a control sequence.

FIG. 4 illustrates an example of bus scrambling 400 with a control sequence according to one or more embodiments of the disclosure. As illustrated, message bits "01110010" may be scrambled on the CAN lines using the control sequence "01011001," which may be a pseudo-random sequence generated by the above-described PRNG. And in examples, as described above, a message bit may be transmitted normally (e.g. in accordance with the standard dominant and recessive levels) on the CAN high and low lines when the corresponding control bit is zero. When the control bit is one, however, the message bit may be represented by flipping the dominant and recessive levels of the CAN high and low lines.

As shown in FIG. 4, the first control bit, 0, allows the message bit, 0, to be transmitted normally, e.g., at the dominant level of 3.5 volts on the CAN high line and at the dominant level of 1.5 volts on the CAN low line. The second control bit, 1, however, effectively flips the original message bit, 1, to a 0, and thus, transmits the message bit as if it was a 0. Then, the third message bit, 1, is transmitted normally, e.g., at the recessive level of approximately 2.5 volts for both the CAN high and low lines, since the control bit is 0, and so on. At the receiving side, the scrambling scheme (e.g., control bit sequence) may be known, and thus, the receiving node can decrypt or unscramble the received message.

It may be understood that one of the numerous advantages of scrambling bus messages in the above-described manner is that the entire message frame can be scrambled, or effectively encrypted, at the physical level such that the entire message (and not just the message payload) is confidentially transmitted over the CAN bus. Typically, at higher stack levels, only the message payload is encrypted. Moreover, the control sequence may be understood to be similar to a key for encrypting and decrypting a message. Thus, it may be understood that the control sequence may be confidentially shared or accessed by the communicating nodes so that messages can be properly scrambled and unscrambled at the respective nodes.

According to further embodiments, it is possible for communicating nodes to implement both voltage-encoded authentication and bus scrambling encryption on a single message frame being transmitted over a CAN bus line, thereby significantly increasing overall communication security between the communicating parties.

Figure 5:
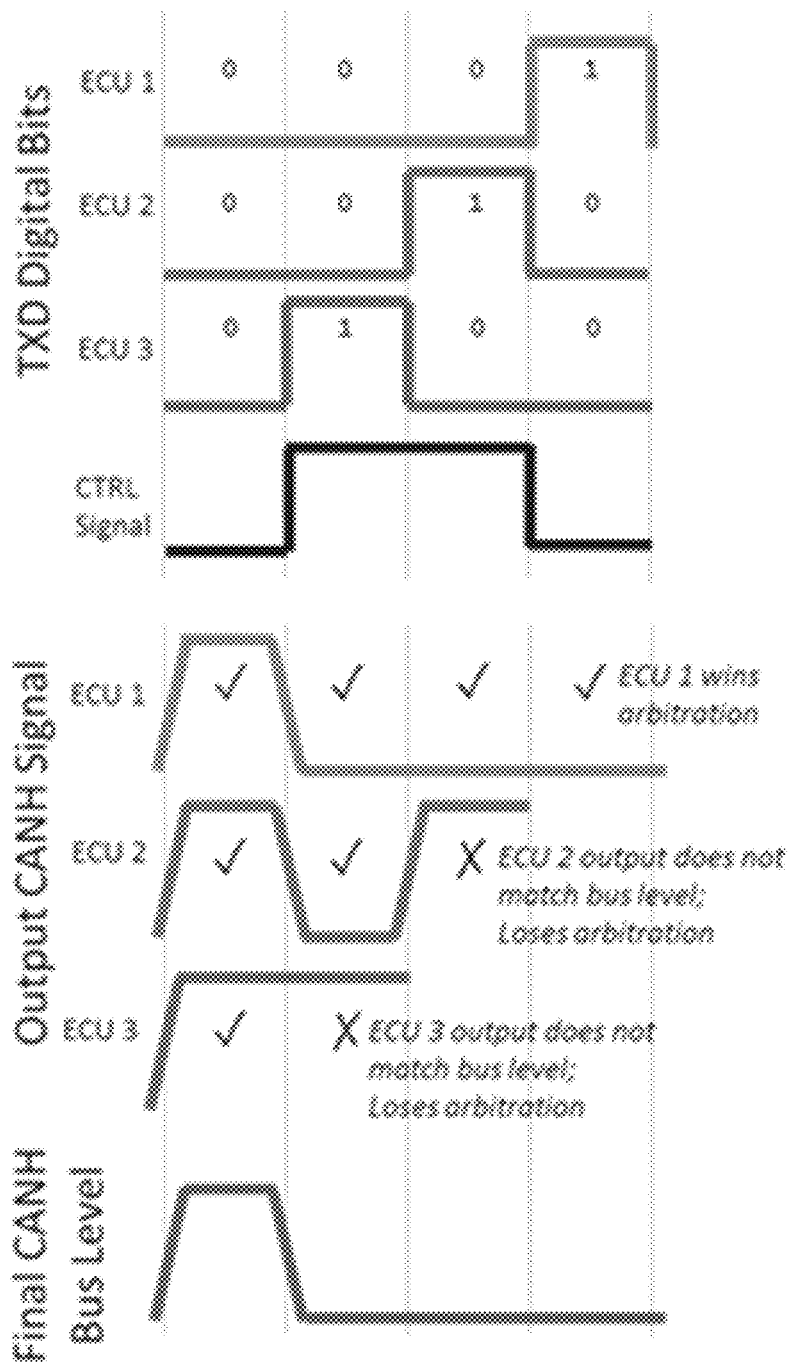
FIG. 5 illustrates an example bus scrambling arbitration scheme.

FIG. 5 illustrates an example bus scrambling arbitration scheme 500 according to one or more embodiments of the disclosure. When multiple nodes desire to communicate information over a CAN bus at the same time, the message with the highest priority wins what is called bus arbitration and has the right to transmit the message. Because bus scrambling may invert arbitration information contained in message frames, a bus scrambling arbitration scheme may resolve this issue in real-time or near real-time. For example, CAN bus protocols may be set such that dominant signals "win" arbitration over recessive ones. Thus, inverting the dominant and recessive levels during bus scrambling will inadvertently allow "true" recessive signals to win arbitration and true dominant signals to lose arbitration.

According to embodiments, the bus scrambling arbitration scheme may provide a bus transceiver the ability to switch between pull-up and pull-down modes, e.g., the CTRL bit can guide the mapping of voltage levels to logical 0s and 1s, as shown in the table below.

| Logical Bit | CTRL | |
|---|---|---|
| | 0 | 1 |
| 0 | CANH = 3.5 V, CANL = 1.5 V | CANH ≈ CANL ≈ 1.5 V |
| 1 | CANH ≈ CANL ≈ 2.5 V | CANH = 3.5 V, CANL = 1.5 V |

For example, independent of the voltage levels in the bus, logical 0 will remain a dominant digital bit. In particular, when CTRL equals one, logical 0 may be represented by CANH≈CANL≈2.5V (which was previously recessive in normal operation), while logical 1 may be represented by CANH=3.5V, CANL=1.5V (which was previously dominant in normal operation). When CTRL equals zero, the bus levels remain at the same usual levels. In at least that regard, the switching of the bus voltages while keeping the dominance of logical 0s is what allows arbitration to work in accordance with the CAN bus standard.

In FIG. 5, for example, three different in-vehicle components (e.g., ECUs) communicating over the CAN bus (e.g., for ease of explanation, the CAN high line) may be disputing priority, each ECU transmitting a message identifier ("MID"): ECU 1 may transmit MID=0001, ECU 2 may transmit MID=0010, and ECU 3 may transmit MID=0100. In typical CAN arbitration, the lower the MID, the higher the message priority, which means that ECU 1 should win arbitration.

As shown, the first MID bit that all of the ECUs transmit may be 0, and since CTRL is set to zero, the respective ECU transceivers may send a high level to the CAN bus (e.g., 3.5 volts), which causes the final bus level to be 3.5 volts. Via one or more feedback signals, all of the ECUs check and confirm the bus consistency against the values they have respectively sent (e.g., represented by the illustrated check marks in FIG. 5). At this point, however, all of ECUs are still competing for bus priority.

For the second MID bit, ECUs 1 and 2 may send 0s and ECU 3 may send a 1. Since, here, CTRL is set at one, the ECU transceivers will output a flipped bus level, e.g., ECUs 1 and 2 will output 2.5 volts (V), ECU 3 will output 3.5 volts. Thus, the 2.5 V levels will dominate and determine the final bus level. At this point, ECU 3 determines that the bus has not followed the level it has output and will lose arbitration.

For the third bit, ECU 1 may transmit a 0 and ECU 2 may send a 1. Since CTRL is one, the respective transceivers will output 2.5 volts and 3.5 volts. At this point, ECU 2 will determine that the final bus level has not followed its level and will lose arbitration. Accordingly, ECU 1 may win arbitration. Advantageously, arbitration can be resolved in real-time or near real-time while performing bus scrambling.

Figure 6:
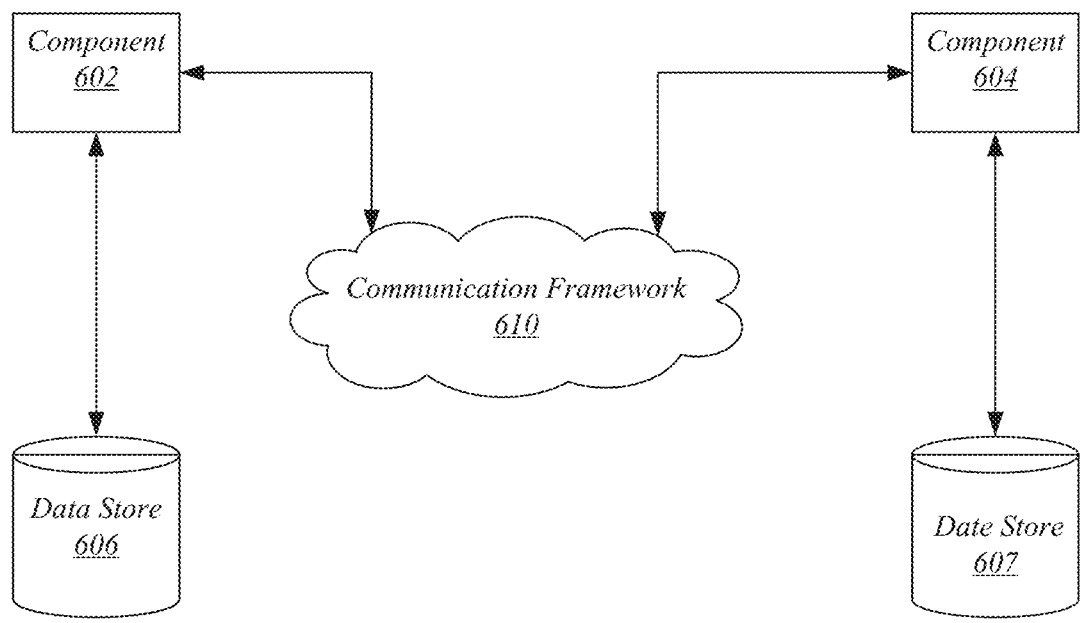
FIG. 6 illustrates an example in-vehicle communications architecture

FIG. 6 illustrates an exemplary in-vehicle communications architecture 600 according to one or more embodiments of the disclosure. For example, one or more vehicular components, such as component 602 and 604, may communicate with each other via a communications framework 610, which may be an in-vehicle network, such as a CAN bus, implemented to facilitate authentication and confidentiality mechanisms during communications over the network, as described above.

The communications architecture 600 includes various common communications elements, such as a transmitter, receiver, transceiver, and so forth. The embodiments, however, are not limited to implementation by the communications architecture 600.

As shown in FIG. 6, the vehicular components 602 and 604 may each be operatively connected to one or more respective client data stores 606 and 607 that can be employed to store information local to the respective components 602 and 604, such as cookies and/or associated contextual information. It may be understood that the components 602 and 604 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 610 in a vehicle.

Further, the communications framework 610 may implement any well-known communications techniques and protocols. As described above, the communications framework 610 may be implemented as a CAN bus protocol or any other suitable in-vehicle communication protocol.

The communications framework 610 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 610 may employ both wired and wireless connections.

Figure 7A:
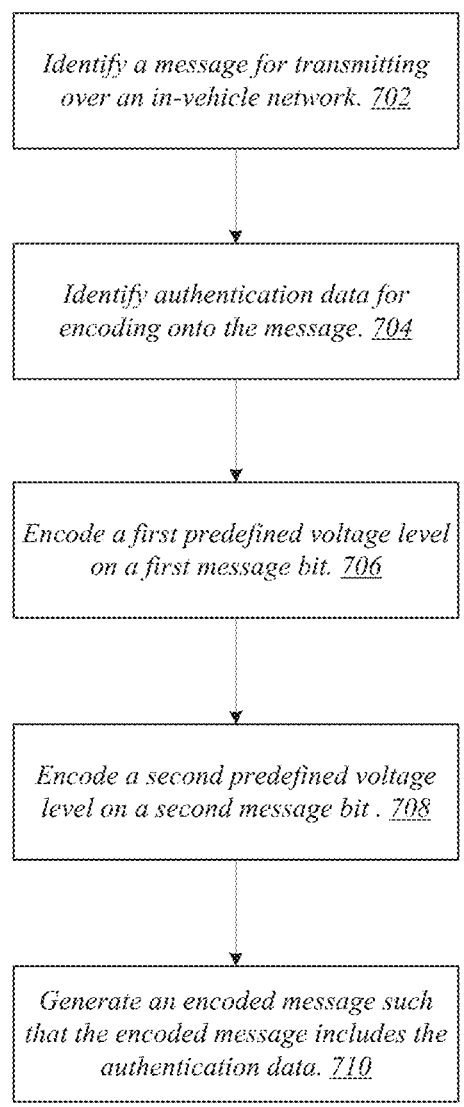
FIG. 7A illustrates a first example flow diagram.

FIG. 7A illustrates an example flow diagram 700 of voltage-encoded authentication according to one or more embodiments of the disclosure. It may be understood that the features described in each block may be executed by processing circuitry or any other suitable circuitry, and further, it may be understood that the blocks are not required to be performed in any specific order.

At block 702, a message for transmitting over an in-vehicle network may be identified. In examples, the in-vehicle network may be a CAN bus. As described above, the message may be a message frame, which may include, among others, a message data payload portion. Each bit of the message data may be transmitted to a receiving node a standard voltage levels on the CAN high line, CAN low line, or both.

At block 704, authentication data for encoding onto one or more portions of the message bit may also be identified. In examples, the authentication data may be in the form of a MAC associated with the communicating node. The authentication data may include a plurality of authentication bits. As described above, other types of information may be encoded onto the message frame, such as voltage level agreement information and/or calibration information at the beginning of the frame and EDAC procedures or information on remaining portions of the message frame.

At block 706, a first predefined voltage level may be encoded onto a first message bit. Similarly, at block 708, a second predefined voltage level may be encoded onto a second message bit. The first and second predefined voltage levels may be different from each other, where each predefined voltage level represents or defines a different bit combination of the authentication bits to be encoded. For instance, the first second predefined voltage level can represent bit-pair "00" of the authentication data and the second predefined voltage level can represent bit-pair "11." Other predefined voltage levels can represent bit-pair "01" or "10," or any other possible combinations. Thus, the bit-pair "00" for the authentication data, for example, can be encoded on the first message bit, as described above.

At block 710, an encoded message may be generated based on the encodings of the first predefined voltage level and the second predefined voltage level on the first and second message bits, respectively, such that the encoded message includes the authentication data. Thus, a receiving node may receive the encoded message, decode the message to obtain the authentication data, and verify that the sending node is actually the sending node authorized to transmit the message. As described above, the first and second predefined voltage levels may be part of an encoding scheme that includes additional predefined voltage levels that represent or define other bit combinations of the authentication data. In examples, it may be understood that encoding a voltage level on a message bit may broadly refer to any adjustment, change, shift, modification, raising, lowering, or the like in the physical voltage level of the CAN bus line corresponding to the message bit by a predefined level, increment, etc.

Figure 7B:
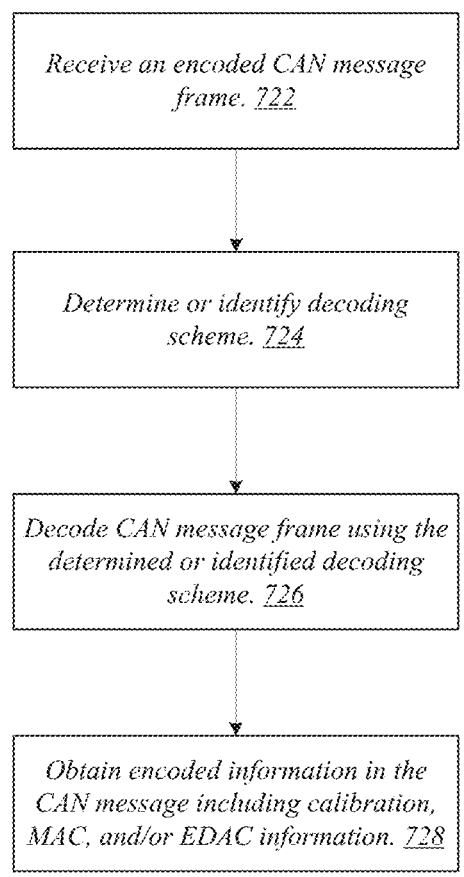
FIG. 7B illustrates a second example flow diagram.

FIG. 7B illustrates an example flow diagram 720 of decoding an encoded message according to one or more embodiments of the disclosure. Again, the features described in each block may be executed by processing circuitry or any other suitable circuitry, and further, it may be understood that the blocks are not required to be performed in any specific order.

At block 722, a receiving node (e.g., transceiver of a receiving vehicular component) may receive an encoded CAN message frame. The CAN message frame may be encoded with at least an authentication data (e.g., MAC) associated with the sending node. As described above with respect to FIG. 2C, the message frame may include more than just the message payload. For instance, the beginning and end portions of the message frame can be used for encoding calibration and/or EDAC related information.

At block 724, a decoding scheme may be determined or identified. The decoding scheme may directly correlate to the encoding scheme used by the sending node, which may have been previously shared with the receiving node. For example, as described above, the chart depicted in FIG. 2B may be shared, which may be used by the receiving node to read the voltage levels encoded onto the recessive and dominant levels and to further decipher or reconcile the MAC bits or bit pairs represented by the encoded voltage levels. Also, as described above, the voltage encoding-decoding agreement may be dynamically encoded into the message frame, where the receiving node can decode the message based on that agreement.

At block 726, using the decoding scheme determined or identified at block 724, the receiving node can decode the message frame. And at block 728, the encoded information in the CAN message frame is obtained. In addition to the MAC associated with the sending node, other types of relevant information for better reconciling or determining the MAC, such as calibration or EDAC information, may also be obtained. Thereafter, the receiving node may take the decoded MAC and verify that the MAC is actually associated with the sending node. As described above, while the voltage encoding/decoding scheme may be publicly shared between the communicating nodes, the MAC information used to properly verify authenticity may be communicated among the parties in a private manner (e.g., via key encryption, key agreement protocol, etc.).

Figure 7C:
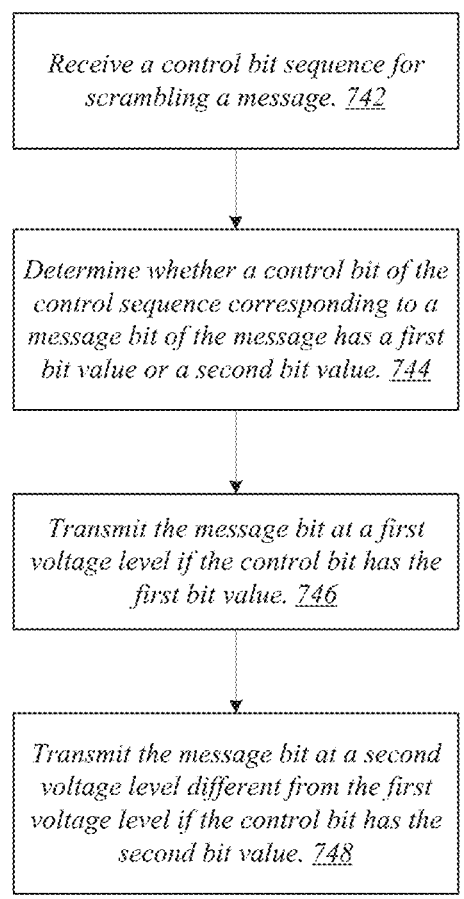
FIG. 7C illustrates a third example flow diagram.

FIG. 7C illustrates an example flow diagram 740 of bus scrambling according to embodiments of the disclosure. Again, it may be understood that the features described in each block may be executed by processing circuitry, and further, it may be understood that the blocks are not required to be performed in any specific order.

At block 742, a control bit sequence for scrambling a message may be received. The control bit sequence may be pseudo-random, and as described above, it may be provided by a pseudo-random number generator that may be coupled to a transceiver. The control bit sequence may include control bits that have a first bit value (e.g., 0) or a second bit value (e.g., 1), and so on.

At block 744, it may be determined whether a control bit (which may be the first control bit, in examples) corresponding to a message bit (which may also be the first message bit) has a first bit value or a second bit value. This determination will decide whether the voltage level on the CAN bus of the original message bit will remain or will be flipped for scrambling purposes.

At block 746, the message bit may be transmitted at a first voltage level if the control bit has the first bit value. And at block 748, the message bit may be transmitted at a second voltage level if the control bit has the second bit value. The first and second voltage levels may be different in that, for example, the first voltage level may the normal transmitting voltage level on the CAN bus while the second voltage level may be a voltage that is the flipped or inverted version of the first voltage level. Thus, as described above, the control bit sequence controls the scrambling or flipping of the voltage values when the message bits are being transmitted on the CAN bus. When the control bit is zero, for instance, the voltage will be at the normal level, and when the control bit is one, the voltage will invert or flip. Further, as described above, arbitration may be resolved in real-time or near real-time as different nodes of the CAN bus are transmitting messages at the same time. Moreover, as described above, bus scrambling arbitration may dictate when the message bits can be sent depending on whether the sending node has priority over other sending nodes.

Figure 7D:
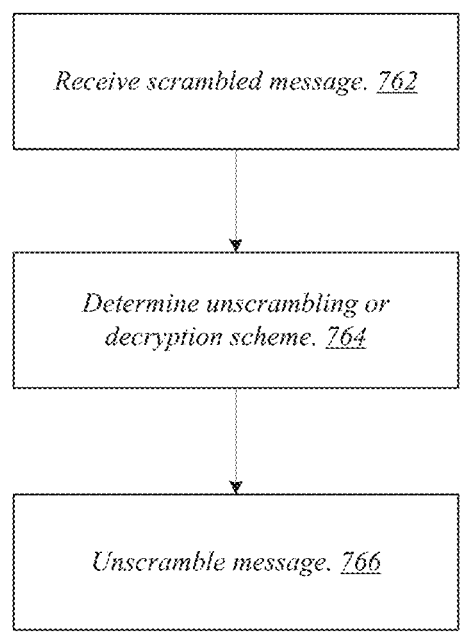
FIG. 7D illustrates a fourth example flow diagram.

FIG. 7D illustrates an example flow diagram 760 of unscrambling a scrambled message according to one or more embodiments of the disclosure. Again, the features described in each block may be executed by processing circuitry or any other suitable circuitry, and further, it may be understood that the blocks are not required to be performed in any specific order.

At block 762, a receiving node (e.g., transceiver of a receiving vehicular component) may receive a scrambled CAN message consisting of a plurality of message bits. As described above, the message bits of the message are "scrambled" in that the recessive or dominant voltage levels of one or more of the message bits are flipped based on a specific control bit sequence. At block 764, the receiving node may determine or identify the mechanism for decrypting or unscrambling the message. In some examples, since the receiving transceiver may also include its own scrambling circuitry, which receives or has access to the control bit sequence used to scramble the incoming message, the receiving node at block 766 can use that specific control bit sequence to unscramble the message. For example, if the control bit sequence was "00010101," the unscrambling process may involve "re-flipping" or "un-flipping" the fourth, sixth, and eighth message bits that were originally flipped based on the positions of the "1" control bits in the sequence. In at least that regard, the control bit sequence may be considered the "key" for encrypting and decrypting the message. It may be understood that the control bit sequences used to globally scramble messages among communicating nodes may be private among just the communicating parties and protected from outside or unauthorized access. And, as described above, the control bit sequences may be generated by a random number generator (RNG) or a pseudo-random number generator (PRNG). In some examples, a synchronized RNG or PRNG across the communicating nodes may be used to ensure that all parties have or have access to the same control bits or control bit sequences.

Moreover, it may be understood that the features described with respect to FIGS. 7A and 7C may be combined in any suitable manner to perform both voltage-encoded authentication and bus scrambling via the same transceiver on the same message transmission over an in-vehicle network.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1

An apparatus for voltage-encoding authentication data onto a message, the apparatus comprising: memory to store instructions; and processing circuitry, coupled to the memory, operable to execute the instructions, that when executed, cause the processing circuitry to: identify a message for transmitting over an in-vehicle network, the message including at least a first message bit and a second message bit; identify authentication data for encoding onto the message, the authentication data including a plurality of authentication bits; encode a first predefined voltage level on the first message bit; encode a second predefined voltage level on the second message bit, wherein the second predefined voltage level is different from the first predefined voltage level; and generate an encoded message based at least in part on the encoding of the first predefined voltage level and the encoding of the second predefined voltage level such that the encoded message includes the authentication data.

Example 2

The apparatus of example 1, wherein the first predefined voltage level represents a first combination of two or more bits of the plurality of authentication bits of the authentication data.

Example 3

The apparatus of example 2, wherein the authentication data is a message authentication code (MAC) and wherein the first combination is a bit-pair of the MAC.

Example 4

The apparatus of example 2, wherein the second predefined voltage level represents a second combination of two or more bits of the plurality of authentication bits of the authentication data.

Example 5

The apparatus of example 2, wherein the second combination is different from the first combination.

Example 6

The apparatus of example 1, wherein the in-vehicle network is a Controller Area Network (CAN) bus.

Example 7

The apparatus of example 1, further comprising a transceiver, and wherein the processing circuitry is further caused to send, via the transceiver, the encoded message to at least one receiving node of the in-vehicle network, the encoded message including the authentication data.

Example 8

The apparatus of example 7, wherein the at least one receiving node receives and decodes the encoded message to verify the authentication data.

Example 9

The apparatus of example 4, wherein the message includes at least a third message bit, and wherein the processing circuitry is further caused to encode a third predefined voltage level on the third message bit.

Example 10

The apparatus of example 4, wherein the third predefined voltage level is different from the first and second predefined voltage levels.

Example 11

The apparatus of example 9, wherein the third predefined voltage level represents a third combination of two or more bits of the plurality of authentication bits of the authentication data.

Example 12

The apparatus of example 9, wherein the third combination is different from the first and second combinations.

Example 13

The apparatus of example 1, wherein "n" number of predefined voltage levels are encodable on the message and transmittable over a Controller Area Network (CAN) high line or a CAN low line of a CAN bus, and wherein log 2(n)

bits of the plurality of authentication bits of the authentication data is encodable per message bit of the message.

Example 14

The apparatus of example 6, wherein the message is transmitted over a CAN high line or a CAN low line of the CAN bus.

Example 15

The apparatus of example 13, wherein voltage increments associated with the n number of predefined voltage levels on the CAN high line is different from voltage increments associated with the n number of predefined voltage levels on the CAN low line, a value of n associated with the n number of predefined voltage levels on the CAN high line is different from a value of n associated with the n number of predefined voltage levels on the CAN low line, or the voltage increments associated with the n number of predefined voltage levels on the CAN high and low lines are gradient, crescent, decrescent, random, or may be based on a predefined sequencing scheme.

Example 16

A system comprising the apparatus of any one of examples 1 to 15.

Example 17

A method for voltage-encoding authentication data onto a message, the method comprising: identifying a message for transmitting over an in-vehicle network, the message including at least a first message bit and a second message bit; identifying authentication data for encoding onto the message, the authentication data including a plurality of authentication bits; encoding a first predefined voltage level on the first message bit; encoding a second predefined voltage level on the second message bit, wherein the second predefined voltage level is different from the first predefined voltage level; and generating an encoded message based at least in part on the encoding of the first predefined voltage level and the encoding of the second predefined voltage level such that the encoded message includes the authentication data.

Example 18

The method of example 17, wherein the first predefined voltage level represents a first combination of two or more bits of the plurality of authentication bits of the authentication data.

Example 19

The method of example 18, wherein the authentication data is a message authentication code (MAC) and wherein the first combination is a bit-pair of the MAC.

Example 20

The method of example 18, wherein the second predefined voltage level represents a second combination of two or more bits of the plurality of authentication bits of the authentication data.

Example 21

The method of example 18, wherein the second combination is different from the first combination.

Example 22

The method of example 17, wherein the in-vehicle network is a Controller Area Network (CAN) bus.

Example 23

The method of example 17, further comprising sending, via a transceiver, the encoded message to at least one receiving node of the in-vehicle network, the encoded message including the authentication data.

Example 24

The method of example 23, wherein the at least one receiving node receives and decodes the encoded message to verify the authentication data.

Example 25

The method of example 20, wherein the message includes at least a third message bit, and wherein the processing circuitry is further caused to encode a third predefined voltage level on the third message bit.

Example 26

The method of example 20, wherein the third predefined voltage level is different from the first and second predefined voltage levels.

Example 27

The method of example 24, wherein the third predefined voltage level represents a third combination of two or more bits of the plurality of authentication bits of the authentication data.

Example 28

The method of example 24, wherein the third combination is different from the first and second combinations.

Example 29

The method of example 17, wherein "n" number of predefined voltage levels are encodable on the message and transmittable over a Controller Area Network (CAN) high line or a CAN low line of a CAN bus, and wherein $\log 2(n)$ bits of the plurality of authentication bits of the authentication data is encodable per message bit of the message.

Example 30

The method of example 22, wherein the message is transmitted over a CAN high line or a CAN low line of the CAN bus.

Example 31

The method of example 29, wherein voltage increments associated with the n number of predefined voltage levels on the CAN high line is different from voltage increments associated with the n number of predefined voltage levels on the CAN low line, a value of n associated with the n number of predefined voltage levels on the CAN high line is different from a value of n associated with the n number of predefined voltage levels on the CAN low line, or the voltage increments associated with the n number of predefined voltage levels on the CAN high and low lines are gradient, crescent, decrescent, random, or may be based on a predefined sequencing scheme.

Example 32

An apparatus for scrambling a message transmitted over an in-vehicle bus, the apparatus comprising: memory to store instructions; and processing circuitry, coupled to the memory, operable to execute the instructions, that when executed, cause the processing circuitry to: receive a control bit sequence for scrambling a message, the control bit sequence including at least a control bit corresponding to a message bit of the message, and wherein the control bit has a first bit value or a second bit value different form the first value; determine whether the control bit has the first bit value or the second bit value; transmit the message bit at a first voltage level if the control bit has the first bit value; and transmit the message bit at a second voltage level different from the first voltage level if the control bit has the second bit value.

Example 33

The apparatus of example 32, wherein the first bit value is 0 and the second bit value is 1.

Example 34

The apparatus of example 33, wherein the first voltage level is a normal or standard voltage level for transmitting the message over a high Controller Area Network (CAN) line or a low CAN line of a CAN bus.

Example 35

The apparatus of example 34, wherein the second voltage level is an inverted or flipped voltage level relative to the normal or standard voltage level for transmitting the message.

Example 36

The apparatus of example 34, wherein the normal or standard voltage level is a dominant level of approximately 3.5 V for a logical 0 bit and a recessive level of approximately 2.5 V for a logical 1 bit.

Example 37

The apparatus of example 32, wherein the processing circuitry is further caused to perform bus scrambling arbitration based on an arbitration scheme in real-time or near real-time.

Example 38

The apparatus of example 32, wherein the control bit sequence is a pseudo-random control sequence provided by a pseudo-random number generator (PRNG).

Example 39

A method for scrambling a message transmitted over an in-vehicle bus, the method comprising: receiving a control bit sequence for scrambling a message, the control bit sequence including at least a control bit corresponding to a message bit of the message, and wherein the control bit has a first bit value or a second bit value different form the first value; determining whether the control bit has the first bit value or the second bit value; transmitting the message bit at a first voltage level if the control bit has the first bit value; and transmitting the message bit at a second voltage level different from the first voltage level if the control bit has the second bit value.

Example 40

A system comprising the apparatus of any one of examples 32 to 38.

Example 41

At least one machine-readable storage medium comprising instructions that when executed by at least one processor, causes the at least one processor to: identify a message for transmitting over an in-vehicle network, the message including at least a first message bit and a second message bit; identify authentication data for encoding onto the message, the authentication data including a plurality of authentication bits; encode a first predefined voltage level on the first message bit; encode a second predefined voltage level on the second message bit, wherein the second predefined voltage level is different from the first predefined voltage level; and generate an encoded message based at least in part on the encoding of the first predefined voltage level and the encoding of the second predefined voltage level such that the encoded message includes the authentication data.

Example 42

The at least one machine-readable storage medium of example 41, wherein the first predefined voltage level represents a first combination of two or more bits of a plurality of authentication bits of the authentication data.

Example 43

The at least one machine-readable storage medium of example 42, wherein the authentication data is a message authentication code (MAC) and wherein the first combination is a bit-pair of the MAC.

Example 44

The at least one machine-readable storage medium of example 42, wherein the second predefined voltage level represents a second combination of two or more bits of the plurality of authentication bits of the authentication data, the second combination being different from the first combination.

Example 45

The at least one machine-readable storage medium of example 41, wherein the in-vehicle network is a Controller Area Network (CAN) bus.

Example 46

The at least one machine-readable storage medium of example 41, wherein "n" number of predefined voltage levels are encodable, and wherein log 2(n) bits of a plurality of authentication bits of the authentication data is encodable per message bit.

Example 47

At least one machine-readable storage medium comprising instructions that when executed by at least one processor, causes the at least one processor to: receive a control bit sequence for scrambling a message, the control bit sequence including at least a control bit corresponding to a message bit of the message, and wherein the control bit has a first bit value or a second bit value different form the first value; determine whether the control bit has the first bit value or the second bit value; transmit the message bit at a first voltage level if the control bit has the first bit value; and transmit the message bit at a second voltage level different from the first voltage level if the control bit has the second bit value.

Example 48

An apparatus comprising means to perform the method of any one of examples 17 to 31.

Example 49

A system comprising means to perform the method of any one of examples 17 to 31.

Example 50

At least one machine-readable storage medium comprising means to perform the method of any one of the examples 17 to 31.

Example 51

An apparatus comprising the at least one machine-readable storage medium of any one of examples 41 to 46.

Example 52

A system comprising the at least one machine-readable storage medium of any one of examples 41 to 46.

Example 53

An apparatus comprising means to perform the method of example 39.

Example 54

A system comprising means to perform the method of example 39.

Example 55

At least one machine-readable storage medium comprising means to perform the method of example 39.

Example 56

An apparatus comprising the at least one machine-readable storage medium of example 47.

Example 57

A system comprising the at least one machine-readable storage medium of example 47.

Example 58

The method of example 39, wherein the first bit value is 0 and the second bit value is 1.

Example 59

The method of example 58, wherein the first voltage level is a normal or standard voltage level for transmitting the message over a high Controller Area Network (CAN) line or a low CAN line of a CAN bus.

Example 60

The method of example 59, wherein the second voltage level is an inverted or flipped voltage level relative to the normal or standard voltage level for transmitting the message.

Example 61

The method of example 59, wherein the normal or standard voltage level is a dominant level of approximately 3.5 V for a logical 0 bit and a recessive level of approximately 2.5 V for a logical 1 bit.

Example 62

The method of example 39, wherein the processing circuitry is further caused to perform bus scrambling arbitration based on an arbitration scheme in real-time or near real-time.

Example 63

The method of example 39, wherein the control bit sequence is a pseudo-random control sequence provided by a pseudo-random number generator (PRNG).

Example 64

At least one machine-readable storage medium comprising instructions that when executed by at least one processor, causes the at least one processor to: receive a control bit sequence for scrambling a message, the control bit sequence including at least a control bit corresponding to a message bit of the message, and wherein the control bit has a first bit value or a second bit value different form the first value; determine whether the control bit has the first bit value or the second bit value; transmit the message bit at a first voltage level if the control bit has the first bit value; and transmit the message bit at a second voltage level different from the first voltage level if the control bit has the second bit value.

Example 65

The apparatus of example 64, wherein the first bit value is 0 and the second bit value is 1.

Example 66

The apparatus of example 65, wherein the first voltage level is a normal or standard voltage level for transmitting the message over a high Controller Area Network (CAN) line or a low CAN line of a CAN bus.

Example 67

The apparatus of example 66, wherein the second voltage level is an inverted or flipped voltage level relative to the normal or standard voltage level for transmitting the message.

Example 68

The apparatus of example 66, wherein the normal or standard voltage level is a dominant level of approximately 3.5 V for a logical 0 bit and a recessive level of approximately 2.5 V for a logical 1 bit.

Example 69

The apparatus of example 64, wherein the processing circuitry is further caused to perform bus scrambling arbitration based on an arbitration scheme in real-time or near real-time.

Example 70

The apparatus of example 64, wherein the control bit sequence is a pseudo-random control sequence provided by a pseudo-random number generator (PRNG).

What is claimed is:

1. An apparatus, comprising:
    memory to store instructions; and
    processing circuitry, coupled to the memory, operable to execute the instructions, that when executed, cause the processing circuitry to:
        identify a message for transmitting over an in-vehicle network, the message including at least a first message bit and a second message bit;
        identify authentication data for encoding onto the message, the authentication data including a plurality of authentication bits;
        encode a first predefined voltage level on the first message bit, the first predefined voltage level to represent a portion of the plurality of authentication bits of the authentication data;
        encode a second predefined voltage level on the second message bit, wherein the second predefined voltage level is different from the first predefined voltage level, the second predefined voltage level to represent another portion of the plurality of authentication bits of the authentication data; and
        generate an encoded message based at least in part on the encoding of the first predefined voltage level and the encoding of the second predefined voltage level such that the encoded message includes the message and the authentication data for the message.

2. The apparatus of claim 1, wherein the first predefined voltage level represents a first combination of two or more bits of the plurality of authentication bits of the authentication data.

3. The apparatus of claim 2, wherein the authentication data is a message authentication code (MAC) and wherein the first combination is a bit-pair of the MAC.

4. The apparatus of claim 2, wherein the second predefined voltage level represents a second combination of two or more bits of the plurality of authentication bits of the authentication data, the second combination being different from the first combination.

5. The apparatus of claim 1, wherein the in-vehicle network is a Controller Area Network (CAN) bus.

6. The apparatus of claim 1, further comprising a transceiver, and wherein the processing circuitry is further caused to send, via the transceiver, the encoded message to at least one receiving node of the in-vehicle network, the encoded message including the authentication data.

7. The apparatus of claim 6, wherein the at least one receiving node receives and decodes the encoded message to verify the authentication data.

8. The apparatus of claim 4, wherein the message includes at least a third message bit, and wherein the processing circuitry is further caused to encode a third predefined voltage level on the third message bit, the third predefined voltage level being different from the first and second predefined voltage levels.

9. The apparatus of claim 8, wherein the third predefined voltage level represents a third combination of two or more bits of the plurality of authentication bits of the authentication data, the third combination being different from the first and second combinations.

10. The apparatus of claim 1, wherein "n" number of predefined voltage levels are encodable on the message and transmittable over a Controller Area Network (CAN) high line or a CAN low line of a CAN bus, and wherein log 2(n) bits of the plurality of authentication bits of the authentication data is encodable per message bit of the message.

11. The apparatus of claim 5, wherein the message is transmitted over a CAN high line or a CAN low line of the CAN bus.

12. The apparatus of claim 10, wherein:
    voltage increments associated with the n number of predefined voltage levels on the CAN high line is different from voltage increments associated with the n number of predefined voltage levels on the CAN low line,
    a value of n associated with the n number of predefined voltage levels on the CAN high line is different from a value of n associated with the n number of predefined voltage levels on the CAN low line, or
    the voltage increments associated with the n number of predefined voltage levels on the CAN high and low lines are gradient, crescent, decrescent, random, or may be based on a predefined sequencing scheme.

13. A method comprising:
    identifying a message for transmitting over an in-vehicle network, the message including at least a first message bit and a second message bit;
    identifying authentication data for encoding onto the message, the authentication data including a plurality of authentication bits;
    encoding a first predefined voltage level on the first message bit, the first predefined voltage level to represent a portion of the plurality of authentication bits of the authentication data;
    encoding a second predefined voltage level on the second message bit, wherein the second predefined voltage level is different from the first predefined voltage level, the second predefined voltage level to represent another portion of the plurality of authentication bits of the authentication data; and
    generating an encoded message based at least in part on the encoding of the first predefined voltage level and the encoding of the second predefined voltage level such that the encoded message includes the message and the authentication data for the message.

14. The method of claim 13, wherein the first predefined voltage level represents a first combination of two or more bits of the plurality of authentication bits of the authentication data.

15. The method of claim 14, wherein the authentication data is a message authentication code (MAC) and wherein the first combination is a bit-pair of the MAC.

16. The method of claim 14, wherein the second predefined voltage level represents a second combination of two or more bits of the plurality of authentication bits of the authentication data, the second combination being different from the first combination.

17. The method of claim 13, wherein the in-vehicle network is a Controller Area Network (CAN) bus.

18. The method of claim 13, wherein "n" number of predefined voltage levels are encodable, and wherein log 2(n) bits of a plurality of authentication bits of the authentication data is encodable per message bit.

19. The method of claim 17, wherein the message is transmitted over a CAN high line or a CAN low line of the CAN bus.

20. At least one non-transitory machine-readable storage medium comprising instructions that when executed by at least one processor, causes the at least one processor to:
encode a first predefined voltage level on a first message bit of a message, the first predefined voltage level to represent a portion of a plurality of authentication bits of authentication data for the message;
encode a second predefined voltage level on a second message bit of the message, wherein the second predefined voltage level is different from the first predefined voltage level, the second predefined voltage level to represent another portion of the plurality of authentication bits of the authentication data;
generate an encoded message based at least in part on the encoding of the first predefined voltage level and the encoding of the second predefined voltage level such that the encoded message includes the message and the authentication data for the message; and
send the encoded message over an in-vehicle network.

21. The at least one machine-readable storage medium of claim 20, wherein the first predefined voltage level represents a first combination of two or more bits of the plurality of authentication bits of the authentication data.

22. The at least one machine-readable storage medium of claim 21, wherein the authentication data is a message authentication code (MAC) and wherein the first combination is a bit-pair of the MAC.

23. The at least one machine-readable storage medium of claim 21, wherein the second predefined voltage level represents a second combination of two or more bits of the plurality of authentication bits of the authentication data, the second combination being different from the first combination.

24. The at least one machine-readable storage medium of claim 20, wherein the in-vehicle network is a Controller Area Network (CAN) bus.

25. The at least one machine-readable storage medium of claim 20, wherein "n" number of predefined voltage levels are encodable, and wherein log 2(n) bits of a plurality of authentication bits of the authentication data is encodable per message bit.

* * * * *